July 16, 1929.  W. A. VAN BRUNT  1,720,982
HOLDER FOR FISHING RODS
Filed March 16, 1925

Inventor
Willard A. Van Brunt.
By Lyon & Lyon
Attorneys.

Patented July 16, 1929.

1,720,982

UNITED STATES PATENT OFFICE.

WILLARD A. VAN BRUNT, OF LOS ANGELES, CALIFORNIA.

HOLDER FOR FISHING RODS.

Application filed March 16, 1925. Serial No. 15,929.

This invention relates to a holder for supporting the butt end of a fishing rod while angling. Such devices are sometimes attached to a boat seat or gunwale and are frequently carried on a belt worn by the angler. In using a fishing rod with such a support, when the reel is rotated there is a tendency for the rod to rotate on its longitudinal axis. This tendency may interfere with the handling of the rod by the angler.

The general object of this invention is to produce a holder of this kind of such construction as will enable it to operate as a support for the butt end of the pole and permit the rod to be swung freely laterally in either direction; and at the same time to provide the device with means for preventing rotation of the rod on its longitudinal axis, when the reel is operated. Also to provide simple and effective means for supporting such a holder on the angler's body.

Further objects of the invention will appear hereinafter.

The invention consists in the novel parts and combination of parts to be described hereinafter, all of which contribute to produce an efficient holder for a fishing rod.

The preferred embodiment of the invention is described in the following specification while the broad scope of the invention is pointed out in the appended claim.

Figure 1:
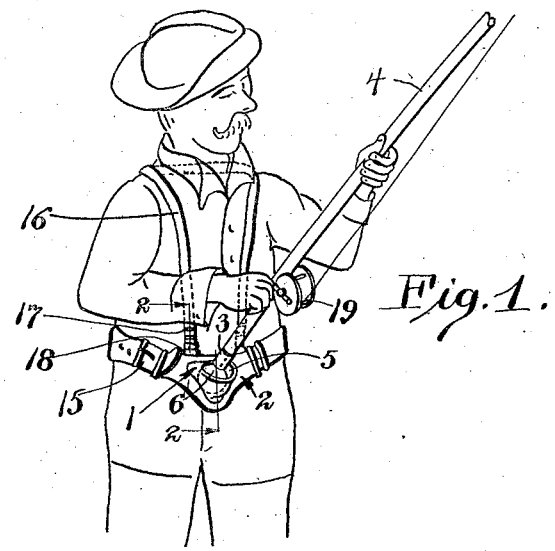
Figure 1 is a perspective of a holder embodying my invention and representing the same worn by an angler.

In practicing my invention I provide a holder which supports the butt end of the rod and this supporting member includes a universal joint operating to support the rod and having means for preventing rotation of the rod on its longitudinal axis.

In the present embodiment of the invention the holder includes a relatively fixed body member 1, which is attached to the forward face of a pad 2 and projects forward from the same.

This body member supports the butt end 3 of a fishing rod 4 through the medium of a universal joint which permits the rod 4 to be swung laterally on an axis at the support and which also permits a movement of the rod up or down, that is, in a vertical plane. In order to accomplish this the butt end of the rod and the body member are provided with cooperating means which will prevent rotation of the rod on its longitudinal axis without interfering in any way with the freedom of movement of the rod laterally.

To this end the body member 1 is preferably constructed with an open socket 5 of substantially hemispherical form, and the butt end of the rod is provided with a knob 6 which is preferably of spherical form so as to fit into the socket.

At diametrically opposite points on the socket I provide means such as gudgeons or trunnions 7 which project inwardly in a substantially horizontal plane, that is, so that they will project transversely across the front of the body of the person holding the pole. They, of course, project toward the center of the socket or cup; and on the knob 6 I provide a circumferential groove 8 which is disposed substantially in the plane of the longitudinal axis of the rod. These trunnions or gudgeons 7 project into this groove at their inner ends and thereby prevent rotation of the rod on its longitudinal axis.

The trunnions 7 are preferably formed integrally with a semi-circular bar or stirrup 9 (see Fig. 3), the body of which lies in the groove.

In order to assist in placing the stirrup in position, in the edge of the cup I provide openings 10 considerably larger than the trunnions 7 and I mount each trunnion in a bushing 11. These bushings are tight in their openings but permit the trunnions 7 to rotate freely.

Figures 2, 3:
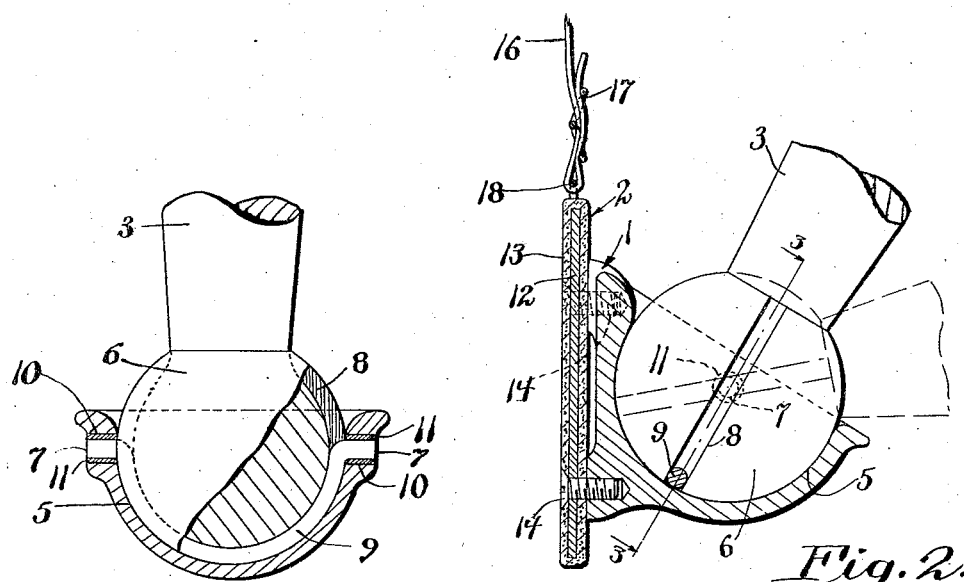
Fig. 2 is a vertical section taken about on the line 2—2 of Fig. 1 and upon an enlarged scale; in this view a short portion of the butt end of the rod is indicated broken away, and in dotted lines the possible movement of the rod in a vertical plane is indicated.
Fig. 3 is a cross section taken about on the line 3—3 of Fig. 2 but showing the butt end of the rod partially in section and broken away.

It will be evident that the trunnions and the bar 9 will permit the rod to be swung either vertically or laterally and at the same time they will prevent its rotation on its longitudinal axis. If the angler wishes to use the rod 4 free from the holder he swings the rod to an inclined position, substantially as shown in Figs. 1 and 2, whereupon a movement of the rod longitudinally disconnects the knob 6 from the socket 5 and stirrup 9, the knob passing through the mouth of the socket. If the rod 4 is swung downwardly in a vertical plane, as indicated by the dotted lines in Fig. 2, the knob or ball 6 will operate to lock itself in the socket, for it will be evident that when the rod is swung down in this way the stirrup 9 together with its gudgeons or trunnions 7 will guide the ball in a direction that would prevent the knob from being pulled out of the socket, therefore, the angler, if he so desires, may remove his hands from the rod when it is in its lowermost position without fear of losing the rod and tackle.

Referring again to the pad 2 I prefer to construct this pad with a body 12 formed of a metal plate with a covering 13 of leather or similar material, the pad being secured to the body members by suitable screws 14 which may have heads countersunk at the inner side of the pad.

The pad forms the forward portion of a belt which passes around the body of the angler and is provided with means of adjustment such as a buckle 15.

I prefer to provide means in addition to the belt, for supporting the pad, and this is preferably in the form of a strap 16 which forms a loop around the back of the angler's neck, the lower ends of the strap being attached by means of adjustable buckles 17 to elongated wire eyes 18 attached to the upper edge of the metal plate 12 (see Fig. 2).

When the angler rotates the reel 19 which is attached to the rod near the butt end, my support will operate to prevent rotation of the rod on its axis. At the same time it will be evident that the support will permit perfect freedom of movement which is necessary for a rod to have in landing a fish.

It is understod that the embodiment of the invention described herein is only one of the many embodiments this invention may take and I do not wish to be limited in the practice of the invention, nor in the claim, to the particular embodiment set forth.

What I claim is:

In a fishing rod construction, the combination of a relatively fixed body having a substantially spherical socket, a rod with a substantially spherical knob at its butt end fitting in the socket and adapted to pass through the mouth thereof and disconnectible from the socket at will, said knob having a circumferential groove disposed substantially in a plane passing through the longitudinal axis of the rod, means carried by the socket received in the groove, extending around less than half the circumference of the knob, and cooperating therewith to prevent rotation of the rod on its longitudinal axis while permitting free movement of the rod along its own axis in one position to detach the rod from the socket and permitting free swinging movement of the rod either in a vertical or lateral direction, said means acting upon the knob to prevent withdrawal thereof from the socket when the rod is in a lowered position.

Signed at Los Angeles, California, this 2d day of March, 1925.

WILLARD A. VAN BRUNT.